(12) United States Patent
Ho et al.

(10) Patent No.: US 8,083,349 B2
(45) Date of Patent: Dec. 27, 2011

(54) ALIPHATIC POLYESTERPOLYOL-BASED URETHANE METHACRYLATE EDGE COATED GLASS POLARIZED LENS

(75) Inventors: Christopher Ho, Chiayi County (TW); Michael Chiou, Yunlin County (TW); Chun-Chieh Chen, Yunlin County (TW)

(73) Assignee: Cornerstone Optical Co., Ltd., Liu Chiao (TW)

( * ) Notice: Subject to any disclaimer, the term of this patent is extended or adjusted under 35 U.S.C. 154(b) by 792 days.

(21) Appl. No.: 12/172,970

(22) Filed: Jul. 14, 2008

(65) Prior Publication Data

US 2009/0207374 A1    Aug. 20, 2009

(30) Foreign Application Priority Data

Feb. 15, 2008   (TW) ................. 97105324 A

(51) Int. Cl.
*G02C 7/12* (2006.01)
*G08B 1/08* (2006.01)
*C09K 19/52* (2006.01)

(52) U.S. Cl. ....... 351/163; 351/174; 428/1.31; 428/1.32

(58) Field of Classification Search ................ 428/423.1, 428/1.31, 1.32; 351/163, 174
See application file for complete search history.

(56) References Cited

U.S. PATENT DOCUMENTS

| | | | |
|---|---|---|---|
| 4,076,863 A | 2/1978 | Onoki et al. | |
| 5,220,358 A | 6/1993 | Brown et al. | |
| 5,327,180 A * | 7/1994 | Hester et al. | 351/165 |
| 5,484,864 A * | 1/1996 | Usifer et al. | 526/301 |
| 6,860,600 B2 | 3/2005 | Chen | |
| 2006/0204895 A1 * | 9/2006 | Sailer et al. | 430/273.1 |

* cited by examiner

*Primary Examiner* — Thao T. Tran
(74) *Attorney, Agent, or Firm* — Christie, Parker & Hale, LLP

(57) ABSTRACT

An edge coated glass polarized lens includes a lens body and an edge coating made from a UV curable material having a composition including: an aliphatic polyesterpolyol based urethane methacrylate formed by reaction of reactants including an aliphatic polyesterpolyol, a hydroxyalkyl methacrylate, and a diisocyanate, and having a number average molecular weight ranging from 800 to 4500; a reactive diluent including a methacrylate monomer; an adhesion enhancer including a silane material selected from methacrylate-functional silane, amino methacrylate-functional silane, vinyl-functional silane, and combinations thereof; and a photo initiator.

21 Claims, 2 Drawing Sheets

ALIPHATIC POLYESTERPOLYOL-BASED URETHANE METHACRYLATE EDGE COATED GLASS POLARIZED LENS

CROSS-REFERENCE TO RELATED APPLICATION

This application claims the priority of Taiwanese Patent Application Number 09105324, filed on Feb. 15, 2008.

BACKGROUND OF THE INVENTION

1. Field of the Invention

This invention relates to a glass polarized lens, more particularly to an edge coated glass polarized lens having a peripheral edge coated with an edge coating.

2. Description of the Related Art

The use of polarized lenses becomes increasingly popular in sunglasses. More than regular sunglass lenses, polarized lenses provide additional protection from annoying glare without a very dark tint. Glare is produced when bright light is reflected from smooth surfaces, such as water, snow, and roadways. Glare not only causes ocular fatigue but also creates serious problem to driving safety in terms of limited vision under the presence of blurring glare.

The most common structure of a polarized lens is a multiple-layer lens system comprising at least a first lens wafer, a second lens wafer, and a polarizing layer laminated between the first and second lens wafer. The material of a lens wafer can be glass or plastic. Glass lens material usually performs better than their plastic counterpart on scratch resistance, chemical resistance, optical quality, and polarization efficiency. On the contrary, plastic lens material is more light in weight and impact resistant.

One big challenge a multiple-layer polarized lens will face is delamination. The term delamination refers to separation happened between any two layers of a polarized lens system. Possible causes of lens delamination include the heat and vibration applied to a lens edge during lens edging process, the stress received by a lens edge during and after framing process, and the penetration of water when a laminated lens is used in hot and humid conditions like water sports.

Among those causes described above, the delamination induced by framing stress is the most troublesome one because it may not be detected in the manufacturing process. Very likely a glass polarized lens will delaminate if it is glazed into a frame in a hard way, particularly if the lens is too big in size or unfitted in shape for the frame to glaze. Abnormally big framing stress will be created on the sharp lens bevel apex and delaminate the lens. The initial delamination in this type is usually fine and not visible to inspecting people if inspection is done in just 1 or 2 days from framing. After framing, the tight frame keeps exerting pressure on lens edge and enlarging delaminated area until the additional stress is released through delamination. By that time it would be too late for a manufacturer to find out the defective sunglass because it may be packed or even sent to a customer.

In search of a solution to the delamination problem encountered by a glass polarized lens, edge coating is a sound method because it provides additional binding force to a lens edge against the delamination induced by framing stress. Edge coating also helps to seal a lens edge to inhibit delamination induced by the penetration of water.

U.S. Pat. No. 4,076,863 discloses an edge coating material selected from epoxy resins, alkyd resins, polyurethane resins, unsaturated polyester resins, acrylic resins, and cyanoacylates. Likewise, U.S. Pat. No. 5,220,358 discloses an edge coating including a dimethyl silicone coblocked with vinyl. In both cases, the coating materials need to be cured at a temperature 100° C. or higher for at least 30 minutes. This curing condition will change the color of a polarized lens too much to be cosmetically acceptable since the color of a polarizing layer of a polarized lens is very sensitive to heat above 50° C. A curing temperature lower than 50° C. may prevent such an unfavorable change to a lens color; however, the curing process will become too time consuming. U.S. Pat. No. 6,860,600 discloses a method of edge coating a lens wherein an edge coating material that will strongly bond to the edge but only weakly bond to the optical surfaces of a lens is selected and applied to form a durable edge coating. However, the edge coating materials comprising essentially acrylate solved in organic solvent as set for examples in the method show a poor adhesion with the edge of a glass polarized lens in physical tests. It separated from almost all around the edge of a glass polarized lens after framing. Once an edge coating was separated from a lens edge, it would no longer provide a lens edge with additional binding force against delamination induced by framing stress. Neither can it bean effective protection to a lens edge against delamination induced by the penetration of water. Meanwhile, most acrylates are known of causing sever skin irritation; therefore, excluded from ink formulations by the Society of British Printing Ink Manufacturers (SBPIM). The use of organic solvent is also considered not healthy or environment friendly.

There is a need for edge coating a glass polarized lens that overcomes problems with known methods, and it is the aim of the present invention to provide such a method.

SUMMARY OF THE INVENTION

The object of the present invention is to provide a solution to delamination problems encountered by a glass polarized lens by meeting the following requirements.

1. To be cosmetically acceptable, the color of a glass polarized lens shall not be changed to an appreciated extent that the relative change in luminous transmittance of the said lens exceeds 5% after edge coating as defined by British standard BS2724-1987 Section 6.1 for thermal stability of sunglass filters.

2. To be an effective protection against delamination induced by framing stress, the adhesion of edge coating shall be strong enough so that it will not separate from a lens edge after framing.

3. To inhibit delamination induced by water, the edge coating must have low permeability to water or water vapor.

Edge coating materials can be thermal curable, UV curable, or the mixed. UV curable coating materials are preferred by the present invention because no heat is required for curing the material, thus reducing the chance of changing the color of a polarized lens during the curing process. Furthermore, UV curable materials can be cured in seconds hence a higher productivity can be gained.

Between the two major species of UV curable coating materials, methacrylate is preferred by the present invention than acrylate due to its minimum irritation to skin, stronger adhesion to glass material, and more suitable for thick coating application.

The reason methacrylate is more suitable for thick coating application than acrylate is due to its higher oxygen interference property. With the presence of oxygen, the surface of a methacrylate coating will not get cured; therefore, UV radiation can penetrate through the coating surface and cure deeper layer of coating where no oxygen presents. In contrast, the oxygen interference of acrylate is low. The rapidly cured coating surface acts as an obstacle preventing UV radiation to penetrate through to cure deeper layer, thus difficult for acrylate to form a thick coating.

A thick edge coating is preferred by the present invention because it helps to turn the shape of a lens edge from a sharp V-shape before coating to a smooth U-shape after coating. Framing stress received by a lens edge will be minimized with the smooth U-shape edge coating; thus dramatically reduce the chance for a lens to delaminate or for the edge coating to separate from a lens edge during framing.

According to the present invention, an edge coated glass polarized lens comprises: a lens body including a first glass layer, a second glass layer, and a polarizing layer laminated between the first and second glass layers; said lens body having a peripheral edge and an edge coating coated on the peripheral edge so as to hinder delamination of the lens body from occurring. The edge coating is made from a UV curable material having a composition comprising: an aliphatic polyesterpolyol based urethane methacrylate formed by reaction of reactants comprising an aliphatic polyesterpolyol, a hydroxyalkyl methacrylate, and a diisocyanate, and having a number average molecular weight (Mn) ranging from 800 to 4500; a reactive diluent comprising a methacrylate monomer; an adhesion enhancer comprising a silane material selected from the group consisting of methacrylate-functional silane, amino methacrylate-functional silane, vinyl-functional silane, and combinations thereof; and a photo initiator.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
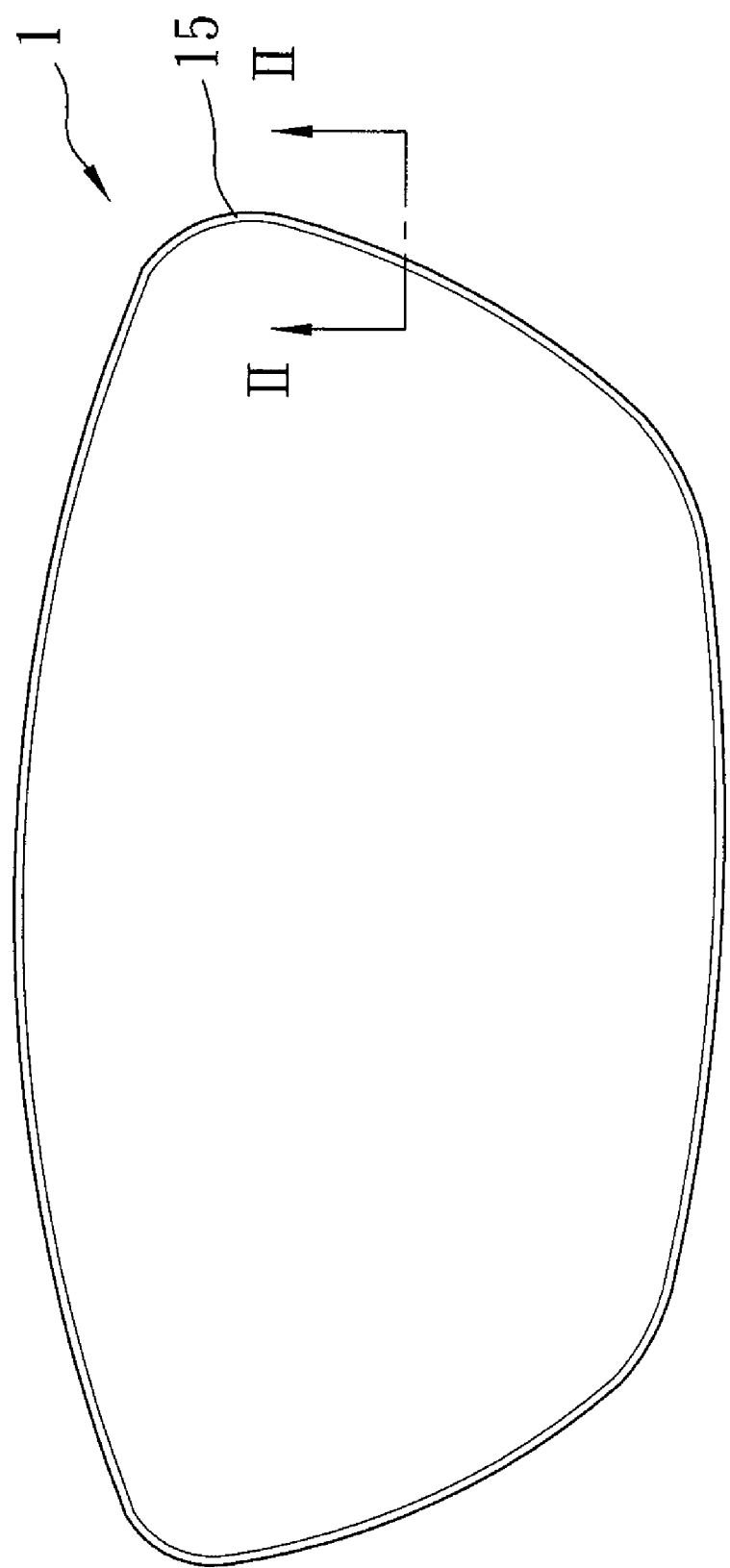
FIG. 1 is a schematic view of the preferred embodiment of an edge coated glass polarized lens according to this invention.
Figure 2:
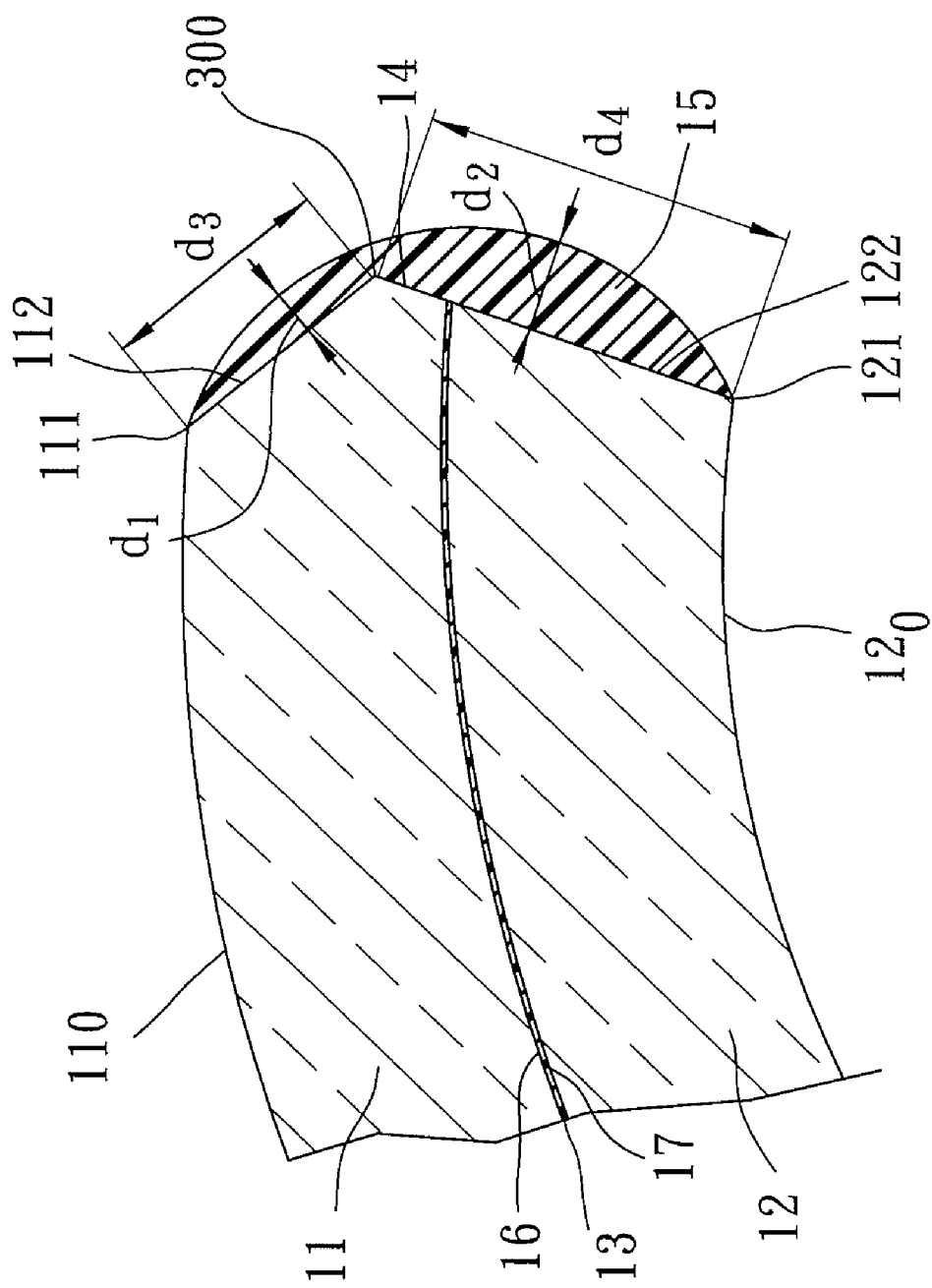
FIG. 2 is a fragmentary sectional view taken along line II-II in FIG. 1.

FIGS. 1 and 2 illustrate the preferred embodiment of an edge coated glass polarized lens based on the present invention. The glass polarized lens includes: a lens body 1 including a first glass layer 11 having a first optical surface 110, a second glass layer 12 having a second optical surface 120, and a polarizing layer 13 laminated between the first and second glass layers 11, 12 through first and second adhesive layers 16, 17, respectively, the lens body 1 having a peripheral edge 14; and an edge coating 15 coated on the peripheral edge 14 so as to hinder delamination from occurring to the lens body 1. The edge coating 15 is made from a UV curable material having a composition comprising: an aliphatic polyesterpolyol based urethane methacrylate formed by reaction of reactants comprising an aliphatic polyesterpolyol, a hydroxyalkyl methacrylate, and a diisocyanate, and having a number average molecular weight ranging from 800 to 4500; a reactive diluent comprising a methacrylate monomer; an adhesion enhancer comprising a silane material selected from the group consisting of methacrylate-functional silane, amino methacrylate-functional silane, vinyl-functional silane, and combinations thereof; and a photo initiator.

The lens body 1 is edged through cutting and beveling by a lens edger (not shown) prior the application of the edge coating 15 thereon. After beveling, the V-shape like lens peripheral edge 14 comprises a lens bevel apex 300, a front lens bevel 112 between the bevel apex 300 and the border 111 of the first optical surface 110, and a rear lens bevel 122 between the bevel apex 300 and the border 121 of the second optical surface 120. In this embodiment, the front lens bevel 112 has a width $d_3$ and the rear lens bevel 122 has a width $d_4$. The ratio between $d_3$ and $d_4$ is about 3:7. The edge coating 15 is formed by applying the coating material to the peripheral edge 14 of the lens body 1, followed by subsequent curing of the coating material. The edge coating 15 thus formed preferably has an U-shape with a maximum coating thickness $d_2$ greater than 80 μm and more preferably greater than 100 μm. In this embodiment, the maximum coating thickness (indicated as $d_2$ in FIG. 2) of the edge coating 15 occurs on the rear lens bevel 122 and is about 100 μm in thickness. The maximum coating thickness on the front lens bevel 112 (indicated as $d_1$ in FIG. 2) is about 60 μm in thickness.

The polarizing layer 13 is preferably made from a polyvinyl alcohol (PVA) based film and can be manufactured by processes well know in the art.

The number average molecular weight of the aliphatic polyesterpolyol based urethane methacrylate and the reactive diluent are used to control the viscosity of the coating material so as to facilitate coating application. The adhesion enhancer is used to enhance the bonding strength of the edge coating 15 with the lens bevels 112 and 122.

Preferably, the aliphatic polyesterpolyol has a number average molecular weight ranging from 500 to 2000, more preferably, from 800 to 2000, and most preferably, about 1000, and is selected from the group consisting of polycarbonate diol, polycaprolactone diol, and combinations thereof. When the number average molecular weight of the aliphatic polyesterpolyol is lower than 500, the edge coating 15 thus formed will have a poor tensile strength. On the other hand, if the number average molecular weight of the aliphatic polyesterpolyol is greater than 2000, the viscosity of coating material will be too high to apply, and the edge coating 15 thus formed will be too soft.

The polycarbonate diol is formed by reaction of reactants comprising dialkyl carbonate and a $C_2$-$C_6$ first alkanediol, and the polycaprolactone diol is formed by reaction of reactants comprising caprolactone and a $C_2$-$C_6$ second alkanediol. Preferably, the first alkanediol is a mixture selected from one of a mixture of butanediol and hexanediol and a mixture of pentanediol and hexanediol. The polycarbonate diol employed in the preferred embodiments is marketed by Asahi Kasei Co. (Japan) under the designation L4671. It is a reaction product of a lower dialkyl carbonate, butanediol, and hexanediol, and has a number average molecular weight of about 1000.

The polycaprolactone diol employed in the preferred embodiments is also marketed by Asahi Kasei Co. (Japan) under the designation PCL-210. It has a number average molecular weight of about 1000 and can be expressed by the following formula (A), in which $R_1$ is a $C_2$-$C_6$ alkylene group, and n1 and n2 are decided by the molecular weight.

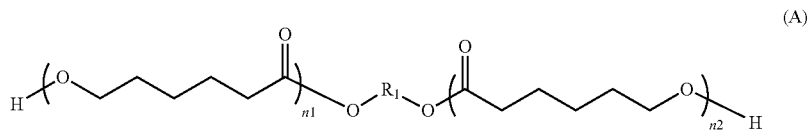

(A)

group consisting of methacrylate-functional silane, amino methacrylate-functional silane, vinyl-functional silane, and combinations thereof; and a photo initiator.

Preferably, the hydroxyalkyl methacrylate is selected from the group consisting of hydroxymethyl methacrylate, hydroxyethyl methacrylate, hydroxyproyl methacrylate, hydroxybutyl methacrylate, hydroxypentyl methacrylate, hydroxyhexyl methacrylate, and combinations thereof, and more preferably, the hydroxyalkyl methacrylate is hydroxyethyl methacrylate.

Preferably, the diisocyanate is selected from the group consisting of isophorone diisocyanate (IPDI), dicyclohexylmethane diiocyanate, 1-methylcyclohexane-2,4-diisocyanate, dicyclohexyl dimethyl-methane p,p'-diisocyanate, and combinations thereof. More preferably, the diisocyanate is isophorone diisocyanate.

Preferably, the molar ratio of the aliphatic polyesterpolyol to the hydroxyalkyl methacrylate and to the diisocyanate is 1:2:2 for producing the aliphatic polyesterpolyol based urethane methacrylate. More preferably, the aliphatic polyesterpolyol based urethane methacrylate is formed by reacting the hydroxyalkyl methacrylate with the diisocyanate in a 1:1 molar ratio to form an intermediate, followed by reacting the intermediate with the aliphatic polyesterpolyol in a 2:1 molar ratio. The aliphatic polyesterpolyol based urethane methacrylate thus formed can be expressed by the following formula:

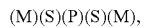

wherein (M) is a residue of the hydroxyalkyl methacrylate, (S) is a residue of the diisocyanate, and (P) is a residue of the aliphatic polyesterpolyol, wherein each (M) is connected to a corresponding (S), and wherein each (S) is connected to (P) through a urethane group. Preferably, the aliphatic polyesterpolyol based urethane methacrylate thus formed has a number average molecular weight ranging from 1100 to 4500, and more preferably, from 1100 to 2000. The aliphatic polyesterpolyol based urethane methacrylate prepared in the preferred embodiment (Example 1) is about 1512.

Preferably, the aliphatic polyesterpolyol based urethane methacrylate is in an amount ranging from 50 to 80 wt % based on the total weight of the composition of the UV curable material, and more preferably, in an amount ranging from 60 to 70 wt % based on the total weight of the composition of the UV curable material.

Preferably, the reactive diluent is selected from at least one of a mono-functional monomer, a bi-functional monomer, and a multi-functional monomer; in which the mono-functional monomer is selected from the group consisting of isobornyl methacrylate, cyclohexyl methacrylate, 2-phenoxy ethyl methacrylate, glycidyl methacrylate, hydroxyethyl methacrylate, hydroxypropyl methacrylate, and combinations thereof; the bi-functional monomer is selected from the group consisting of 1,3-butyleneglycol dimethacrylate, hydroxypivalyl hydroxypivalate dimethacrylate, triethylene glycol dimethacrylate, 1,6-hexanediol dimethacrylate, and combinations thereof; and the multi-functional monomer is selected from the group consisting of tris-(2-hydroxyethyl) isocyanurate trimethacrylate, trimethylol propane trimethacrylate, pentaerythrital tetramethacrylate, and combinations thereof. More preferably, the reactive diluent is selected from the group consisting of isobornyl methacrylate, 2-phenoxy ethyl methacrylate, 1,6-hexanediol dimethacrylate, hydroxypivalyl hydroxypivalate dimethacrylate, hydroxyethyl methacrylate, and combinations thereof.

Preferably, the reactive diluent is in an amount ranging from 20 to 35 wt % based on the total weight of the composition of the UV curable material, and more preferably, in an amount ranging from 25 to 30 wt % based on the total weight of the composition of the UV curable material.

Preferably, the photo initiator is selected from the group consisting of alpha-hydroxy ketone, alpha-amino ketone, benzil dimethyl ketal, benzophenone, phosphine oxide, and combinations thereof.

Preferably, photo initiator is in an amount ranging from 5 to 10 wt % based on the total weight of the composition of the UV curable material.

Preferably, the adhesion enhancer is selected from the group consisting of methacrylate-functional silane, amino methacrylate-functional silane, vinyl-functional silane, and combinations thereof.

Preferably, the adhesion enhancer is in an amount ranging from 1 to 5 wt % based on the total weight of the composition of the UV curable material.

The method of making an edge coated glass polarized lens includes the steps of: (a) applying the edge coating material to the peripheral edge 14 of the edged lens body 1; (b) curing the edge coating material with a spot curing device; and (c) removing the uncured coating material from the surface of edge coating 15.

To achieve rapid curing without changing the color of a lens, a curing method developed by the present inventors is further explained here. A lens to be edge coated is first fixed on the rotating arm of an optical laboratory groover (not shown). After the application of coating material on a lens edge with a cotton bud, the edge coated lens is then cured by a spot curing device.

In a spot curing device, high intensity UV light produced by a high pressure mercury short arc lamp is collected and directed into a flexible light guider made by quartz fibers, then emits out of the end fitting surface of light guider. The end fitting of light guider shall be set to project the spot UV light right on the center of the peripheral edge 14 and in a direction same as the lens rotating plane thus the peripheral edge 14 will be rotated into the spot area of UV light for curing the edge coating material.

The distance between the nearest point of a lens edge and the end fitting surface of light guider is set between 15 and 25 mm for a UV intensity 10 W/cm$^2$ at the end fitting surface of light guider. With such an arrangement, edge coating material can be cured in 1 revolution of the rotating arm of an optical groover (about 20-40 seconds).

The uncured coating material can be easily removed by wiping the edge coating surface with alcohol soaked long fiber tissue.

The merits of the edge coated glass polarized lens by this invention will become apparent with reference to the following Examples and Comparative Examples.

Physical Test Methods

1. Thermal stability test: the luminous transmittance of the test specimen of the glass polarized lens is measured before and after edge coating. The relative change in luminous transmittance of the test specimen after edge coating shall be less than 5% to meet the Bristish standard BS 2724-1987 Section 6.1.

2. Adhesion test: the test specimen of the edge coated glass polarized lens is mounted on a plastic frame and then dismounted. The test specimen is then examined if the edge coating 15 is separated from the lens edge after dismounting.

3. Water resistance test: a group of the test specimens of glass polarized lenses with edge coating 15 are soaked in 23±5° C. tap water. Another group of glass polarized lenses in the same type and quantity as the testing group but without edge coating are tested in the same manner and same time for comparison. Observation of lens delamination is conducted every 12 hours until all specimens delaminate. The average delaminating hours is then calculated for each group, respectively.

EXAMPLE 1

Preparation of the Aliphatic Polyesterpolyol Based Urethane Methacrylate 222 g of IPDI was reacted with 130 g of hydroxyethyl methacrylate (the molar ratio was 1:1) to form an intermediate. 352 g of the intermediate thus formed was reacted with 500 g of a polycarbonate diol (marketed by Asahi Kasei Co. under the designation L4671) to obtain a polycarbonate diol based urethane methacrylate with a number average molecular weight of 1512.

Preparation of Coating Material 65 weight parts of the polycarbonate diol based urethane methacrylate thus formed was mixed with 25 weight parts of hydroxyethyl methacrylate, 7 weight parts of alpha-hydroxy ketone (marketed by Ciba Geigy under the designation IRGACURE® 184), and 3 weight parts of methacrylate-functional silane (marketed by Dow Corning under the designation Z-6030) to form a coating material.

Preparation of the Glass Polarized Lens with the Edge Coating

Coating material prepared by the method mentioned above was applied to the lens edge 14 of each of those 35 specimens (Costa 400 Blue mirror glass lens, marketed by Costa Del Mar Sunglasses Inc. USA under the style name Turbine). The edge coated specimens were then cured by a spot curing device with a UV dosage 1 J/cm². The curing time was about 30 seconds. The cured edge coating 15 on the lens body 1 has a maximumg coating thickness on the rear lens bevel about 100 μm.

Test Results

Five of those 35 edge coated test specimens were subjected to the thermal stability test. Test results showed that the relative change in luminous transmittance of each of those five test specimens was less than 3% after edge coating. All passed the BS2724-1987 standard for thermal stability.

Ten of those 35 edge coated test specimens were subjected to the adhesion test. None of those 10 specimens showed separation of edge coating 15 from their peripheral edge 14 after dismounting.

The remaining 20 edge coated specimens were subjected to water resistance test. Another 20 specimens without edge coating were tested in the same time. As shown in Table 1, the average delaminating hours for those 20 test specimens with edge coating 15 was 161.4 hours, while it was 113.4 hours for those test specimens without edge coating 15, i.e., a 42% improvement in water resistance achieved with the edge coating 15 of Example 1.

TABLE 1

| Lapsed time (hours), L | Number of specimens delaminated, n | | Accumulated time (hours), A = L × n | |
|---|---|---|---|---|
| | Specimens without edge coating (the control group) | Specimens with edge coating (the test group) | Specimens without edge coating (the control group) | Specimens with edge coating (the test group) |
| 12 | 0 | 0 | 0 | 0 |
| 24 | 1 | 0 | 24 | 0 |
| 36 | 0 | 0 | 0 | 0 |

TABLE 1-continued

| Lapsed time (hours), L | Number of specimens delaminated, n | | Accumulated time (hours), A = L × n | |
|---|---|---|---|---|
| | Specimens without edge coating (the control group) | Specimens with edge coating (the test group) | Specimens without edge coating (the control group) | Specimens with edge coating (the test group) |
| 48 | 1 | 0 | 48 | 0 |
| 60 | 0 | 0 | 0 | 0 |
| 72 | 0 | 0 | 0 | 0 |
| 84 | 1 | 0 | 84 | 0 |
| 96 | 1 | 0 | 96 | 0 |
| 108 | 2 | 1 | 216 | 108 |
| 120 | 8 | 3 | 960 | 360 |
| 132 | 3 | 2 | 396 | 264 |
| 144 | 2 | 1 | 288 | 144 |
| 156 | 1 | 3 | 156 | 468 |
| 168 | 0 | 3 | 0 | 504 |
| 180 | 0 | 3 | 0 | 540 |
| 192 | 0 | 0 | 0 | 0 |
| 204 | 0 | 3 | 0 | 612 |
| 216 | 0 | 0 | 0 | 0 |
| 228 | 0 | 1 | 0 | 228 |
| 240 | 0 | 0 | 0 | 0 |
| Summation | 20 | 20 | 2268 | 3228 |
| Average delaminating hours = A/n | | | 2268/20 = 113.4 | 3228/20 = 161.4 |

EXAMPLE 2

Example 2 differs from Example 1 in that the coating material was prepared by using 15 weight parts of hydroxyethyl methacrylate and 10 weight parts of isobornyl methacrylate in stead of 25 weight parts of hydroxyethyl methacrylate in Example 1.

The thermal stability test results show that the relative change in luminous transmittance with each of the five test specimens was less than 3% after edge coating. The adhesion test results show that none of those 10 test specimens showed separation of edge coating 15 from their peripheral edge 14 after dismounting. The water resistance test results show that the average delaminating hours for those 20 test specimens with edge coating 15 was 157.6 hours, i.e., a 39% improvement in water resistance achieved with the edge coating of Example 2.

COMPARATIVE EXAMPLE 1

Comparative Example 1 differs from Example 1 in that the edge coating material was prepared by mixing 100 weight parts of epoxy resin (bisphenol-A type epoxy resin) and 13 weight parts of diethylene tetraamine (acting as a curing agent). Five edge coated specimens were cured in an oven with a curing condition set at 100° C. for 30 minutes. The relative change in luminous transmittance of each test specimen was greater than 20%; therefore, all failed the thermal stability test.

COMPARATIVE EXAMPLE 2

Comparative Example 2 differs from Example 1 in that the edge coating material was prepared by mixing 34.7 weight parts of aromatic polyether based urethane triacrylate (marketed by Satomer under the designation CN-970 A-60) with 23.1 weight parts of tripropylene glycol diacrylate (marketed by Satomer under the designation SR306), 2.7 weight parts of alpha-hydroxyketone (product name: IRGACURE® 184), 0.2 weight part of a leveling agent (marketed by Dow Corning under the designation PA-57), and 39.2 weight parts of methyl-ethyl ketone (functioning as a solvent). The edge coating material prepared by above method was applied to the peripheral edge of 10 test specimens, and then cured by a spot curing device with a UV dosage 1 J/cm$^2$. The adhesion test results showed that the edge coating of each test specimen was separated from the peripheral edge of the lens body after dismounting, i.e. all specimens failed the adhesion test.

COMPARATIVE EXAMPLE 3

Comparative Example 3 differs from Example 1 in that the edge coating material was prepared by mixing 63.4 weight parts of di-trimethylpropane tetraacrylate with 4.3 weight parts of alpha-hydroxy ketone (marketed by Ciba Geigy under the designation IRGACURE® 184), 0.2 weight part of a leveling agent (marketed by Dow Corning under the designation PA-57), and 32.1 weight parts of methyl-ethyl ketone. The adhesion test results showed that the edge coating of each test specimen was separated from the peripheral edge of the lens body after dismounting, i.e. all specimens failed the adhesion test.

As illustrated by the test results of the Comparative Example 1, the color of a glass polarized lens will be changed too much in terms of a relative change in luminous transmittance greater than 20% with the curing condition used for curing an epoxy resin-based edge coating material. Meanwhile, as illustrated by the test results of the Comparative Examples 2 and 3, the acrylate-based edge coating materials shows a poor adhesion with the peripheral edge of a glass polarized lens in terms of separation of edge coating from the lens peripheral edge after dismounting. On the contrary, the edge coating 15 cured from a coating material (aliphatic polyesterpolyol based urethane methacrylate) with the present invention shows a strong adhesion with the peripheral edge 14 of lens body 1 after dismounting, no obvious change in lens color after edge coating, and the water resistance of a glass polarized lens is obviously improved with the edge coating 15. The present invention not only overcomes problems with know methods, but also meets all those mentioned requirements for hindering delamination of a glass polarized lens body from occurring.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. An edge coated glass polarized lens comprising:
a lens body including a first glass layer, a second glass layer, and a polarizing layer laminated between said first and second glass layers, said lens body having a peripheral edge; and
an edge coating coated on said peripheral edge so as to hinder delamination of said lens body from occurring, said edge coating being made from a UV curable material having a composition comprising
an aliphatic polyesterpolyol based urethane methacrylate formed by reaction of reactants comprising an aliphatic polyesterpolyol, a hydroxyalkyl methacrylate, and a diisocyanate, and having a number average molecular weight ranging from 800 to 2000,
a reactive diluent comprising a methacrylate monomer,
an adhesion enhancer comprising a silane material selected from the group consisting of methacrylate-functional silane, amino methacrylate-functional silane, vinyl-functional silane, and combinations thereof, and
a photo initiator.

2. The edge coated glass polarized lens of claim 1, wherein said aliphatic polyesterpolyol has a number average molecular weight ranging from 500 to 2000, and is selected from the group consisting of polycarbonate diol, polycaprolactone diol, and combinations thereof.

3. The edge coated glass polarized lens of claim 2, wherein said polycarbonate diol is formed by reaction of reactants comprising a dialkyl carbonate and a $C_2$-$C_6$ first alkanediol, and said polycaprolactone diol is formed by reaction of reactants comprising a caprolactone and a $C_2$-$C_6$ second alkanediol.

4. The edge coated glass polarized lens of claim 3, wherein said first alkanediol is a mixture selected from one of a mixture of butanediol and hexanediol and a mixture of pentanediol and hexanediol.

5. The edge coated glass polarized lens of claim 2, wherein said aliphatic polyesterpolyol has a number average molecular weight ranging from 800 to 2000.

6. The edge coated glass polarized lens of claim 5, wherein said aliphatic polyesterpolyol has a number average molecular weight of about 1000.

7. The edge coated glass polarized lens of claim 1, wherein said hydroxyalkyl methacrylate is selected from the group consisting of hydroxymethyl methacrylate, hydroxyethyl methacrylate, hydroxyproyl methacrylate, hydroxybutyl methacrylate, hydroxypentyl methacrylate, hydroxyhexyl methacrylate, and combinations thereof.

8. The edge coated glass polarized lens of claim 7, wherein said hydroxyalkyl methacrylate is hydroxyethyl methacrylate.

9. The edge coated glass polarized lens of claim 1, wherein said diisocyanate is selected from the group consisting of isophorone diisocyanate, dicyclohexylmethane diiocyanate, 1-methylcyclohexane-2,4-diisocyanate, dicyclohexyl dimethyl-methane p,p'-diisocyanate, and combinations thereof.

10. The edge coated glass polarized lens of claim 9, wherein said diisocyanate is isophorone diisocyanate.

11. The edge coated glass polarized lens of claim 1, wherein the molar ratio of said aliphatic polyesterpolyol to said hydroxyalkyl methacrylate and to said diisocyanate is 1:2:2 for forming said aliphatic polyesterpolyol based urethane methacrylate.

12. The edge coated glass polarized lens of claim 11, wherein said aliphatic polyesterpolyol based urethane methacrylate is formed by reacting said hydroxyalkyl methacrylate with said diisocyanate in a 1:1 molar ratio to form an intermediate, followed by reacting said intermediate with said aliphatic polyesterpolyol in a 2:1 molar ratio, said aliphatic polyesterpolyol based urethane methacrylate having a formula of $$(M)(S)(P)(S)(M),$$

wherein (M) is a residue of said hydroxyalkyl methacrylate, (S) is a residue of said diisocyanate, and (P) is a residue of said aliphatic polyesterpolyol, wherein each (M) is connected to a corresponding (S), and wherein each (S) is connected to (P) through a urethane group.

13. The edge coated glass polarized lens of claim 1, wherein said aliphatic polyesterpolyol based urethane methacrylate is in an amount ranging from 50 to 80 wt % based on the total weight of said composition of said UV curable material.

14. The edge coated glass polarized lens of claim 13, wherein said aliphatic polyesterpolyol based urethane methacrylate is in an amount ranging from 60 to 70 wt % based on the total weight of said composition of said UV curable material.

15. The edge coated glass polarized lens of claim 1, wherein said reactive diluent is selected from at least one of a mono-functional monomer, a bi-functional monomer, and a multi-functional monomer, said mono-functional monomer being selected from the group consisting of isobornyl methacrylate, cyclohexyl methacrylate, 2-phenoxy ethyl methacrylate, glycidyl methacrylate, hydroxyethyl methacrylate, hydroxypropyl methacrylate, and combinations thereof, said bi-functional monomer being selected from the group consisting of 1,3-butyleneglycol dimethacrylate, hydroxypivalyl hydroxypivalate dimethacrylate, triethylene glycol dimethacrylate, 1,6-hexanediol dimethacrylate, and combinations thereof, said multi-functional monomer being selected from the group consisting of tris-(2-hydroxyethyl) isocyanurate trimethacrylate, trimethylol propane trimethacrylate, pentaerythrital tetramethacrylate, and combinations thereof.

16. The edge coated glass polarized lens of claim 15, wherein said reactive diluent is selected from the group consisting of isobornyl methacrylate, 2-phenoxy ethyl methacrylate, 1,6-hexanediol dimethacrylate, hydroxypivalyl hydroxypivalate dimethacrylate, hydroxyethyl methacrylate, and combinations thereof.

17. The edge coated glass polarized lens of claim 1, wherein said reactive diluent is in an amount ranging from 20 to 35 wt % based on the total weight of said composition of said UV curable material.

18. The edge coated glass polarized lens of claim 17, wherein said reactive diluent is in an amount ranging from 25 to 30 wt % based on the total weight of said composition of said UV curable material.

19. The edge coated glass polarized lens of claim 1, wherein said photo initiator is selected from the group consisting of alpha-hydroxy ketone, alpha-amino ketone, benzil dimethyl ketal, benzophenone, phosphine oxide, and combinations thereof.

20. The edge coated glass polarized lens of claim 19, wherein said photo initiator is in an amount ranging from 5 to 10 wt % based on the total weight of said composition of said UV curable material.

21. The edge coated glass polarized lens of claim 1, wherein said polarizing layer is made from a polyvinyl alcohol based film.

* * * * *